United States Patent
Dunlap

[15] 3,656,925
[45] Apr. 18, 1972

[54] METHOD AND APPARATUS FOR JOINING TWO GLASS PARTS OR ARTICLES

[72] Inventor: Glenn H. Dunlap, Maumee, Ohio
Maumee, Ohio 43537
[73] Assignee: Owens-Illinois, Inc.
[22] Filed: May 28, 1970
[21] Appl. No.: 41,284

[52] U.S. Cl. .......................................65/36, 65/4, 65/152
[51] Int. Cl. .......................................................C03b 23/20
[58] Field of Search..................65/31, 36, 43, 152, 153, 59, 65/4

[56] References Cited

UNITED STATES PATENTS

| | | |
|---|---|---|
| 3,211,540 | 10/1965 | Cole.........................................65/4 |
| 3,216,807 | 11/1965 | Woodcock..................................65/4 |
| 3,224,851 | 12/1965 | Hicks........................................65/4 |
| 3,536,462 | 10/1970 | Eyster et al. ...........................65/36 X |
| 3,467,509 | 9/1969 | Foster et al. ............................65/43 X |
| 3,546,037 | 12/1970 | Sälzle....................................65/31 X |
| 3,287,097 | 11/1966 | Limpel..................................65/59 X |

Primary Examiner—S. Leon Bashore
Assistant Examiner—Robert L. Lindsay
Attorney—Richard B. Dence and E. J. Holler

[57] ABSTRACT

A process for heat sealing together two preformed glass articles preferably adapted to be nested one within the other by a technique which envisions a precise and careful conditioning and treatment of the surfaces to be heat sealed, coupled with temperature control and impressment of particular low pressure conditions as in combination promote the heat sealing joinder of the surfaces and consequently the articles together in a manner as is yieldative of an ultimate produce in which the optical as well as other properties of the preformed glass, as imparted by the compositional makeup thereof, is relatively unimpaired and therefore of high quality. This method is accomplished by a device having an elongate compartment having heaters located outside, with a base to hold the glass cylinder which has an opening connected to a vacuum source at the bottom of the compartment.

7 Claims, 9 Drawing Figures

METHOD AND APPARATUS FOR JOINING TWO GLASS PARTS OR ARTICLES

More particularly, the present invention relates to a method of utility in accomplishing the heat joinder of one preformed glass article with another. The present invention additionally envisions a product possessed of unusually attractive properties as permitted by the practice of the present invention.

The present invention will be described in terms of an application which at the present time evidences the greatest utility as pertains to the novel method involved. The invention is nonetheless capable of a broader utility in connection with a variety of applications and techniques; some of which will be alluded to and some of which will suggest themselves to those skilled in the glass art.

The invention herein concerned finds particular application in the field of manufacturing laser glass assemblies and components. Laser glass compositions are known in the art. Reference may be had, for example, to glasses and compositions disclosed in U.S. Pat. No. 3,471,409, assigned to Owens-Illinois, Inc. The laser assembly may feature a solid glass rod or a plurality of appropriately mounted and positioned discs. In the technology of laser glass and the utilization of laser glass in forming laser energy producers, it has been determined that the laser glass rod is frequently desirably provided with a surrounding glass envelope, referred to as a cladding. The envelope type cladding has as one purpose the screening out of certain wave lengths of light as might otherwise interfere with the lasing efficiency of the core glass. It has been observed in present clad laser components that the interface defined by the joinder of the outer surface of the laser glass core and the inner surface of the cladding is quite important in terms of the ultimate operability and the utility of the laser rod. Thus, if the interface is characterized by defects, whether due to the presence of air, miscellaneous included gases, crystals, tool marks, surface imperfections or any one of a number of the referred to defects, the quality and efficiency of the ultimate function, that is, the lasing function, is adversely affected.

The cladding surrounding the primary laser glass rod also functions to absorb heat that might otherwise be generated in the laser rod. This is accomplished by particular formulation of the glass composition. The cladding also functions as a physical holder, avoiding contact with the primary lasing rod. It is still another function of cladding that the cladding can be machined as to its exterior configuration as to allow for flow of coolant in those laser assemblies which feature a plurality of spaced discs obtained from a primary clad laser rod. In such application, the discs are mounted in a spaced relationship and in predetermined alignment; generally within a hollow cylinder or holder. As indicated, the outer contour of the clad can be machined such as to leave a void or space between the machined away surface and the inner surface of the cylinder or holder in which the disc is mounted, permitting flow of coolant water in a tortuous path. In view of the many functions of the cladding, it will be appreciated that a proper heat joinder of the primary laser rod and the tubular cladding is eminently desirable. Furthermore, it is particularly desirably accomplished with a minimum of difficulty and an absence of phenomena in the nature of defects or the like as would detract from the lasing function of the ultimate assembly.

It has, of course, been established that careful formulation of the core glass in terms of its ultimate compositional analysis is extremely important in the operation of the ultimate laser rod. The same applies to the composition of the cladding glass. Naturally, therefore, techniques for combining a precisely formulated core glass and the precisely formulated cladding glass may well involve conditions or steps of manufacture which feature conditions which detract from or adversely affect the capabilities or performance expected by reason of the precise formulation of the two glass components.

By way of example, it is known that certain laser glass compositions are not readily convertible from molten state into the finished laser rod and/or clad laser rod configuration due to limitations in the formability and the necessity of very accurate finished dimensions. In such cases, the laser glass composition is first formed by casting into an initial cast preform. In the case under consideration, it would be a cast rod of oversized dimensions. The cast specimen is then examined and the best part of the cast glass article is selected for fabrication into the precise configuration desired; said configuration having the desired dimensions. In the case of a laser assembly composed of a cylindrical rod and a tubular cladding, it is desired, of course, that the two be joined together to form the integral optically desirable product. Heat sealing together of such components presents difficulty due to the phenomena of devitrification. Thus, the glass composition ordained by reason of the ultimate lasing function inherently results in a glass which has a low devitrification temperature. By that is meant that the exposure of the glass piece to a temperature in the neighborhood of the devitrification temperature, particularly above same, for a sufficient length of time will result in the initiation of devitrification. This, of course, cannot be tolerated since the presence of devitrification sites adversely affects the function of the ultimate assembly in its lasing function.

With the foregoing introduction, it may be stated that it is a particular object of the present invention to provide a novel method of heat sealing together a laser rod and a surrounding tubular cladding in an effective and efficient manner substantially devoid of accompanying adverse defects.

It is a significant object of the present invention to provide a method as described characterized in that with glasses of critical composition, and usually attendant devitrification, heat sealing is accomplished in a manner that avoids devitrification and other optical defects.

It is still another object of the present invention to provide a method of heat sealing together two glass articles in a manner as provides an interface of heat joinder; which interface is characterized by the substantial absence of visual and/or optical defects.

It is yet another object of the present invention to provide a method as described which is capable of being carried out in a reproducible manner as permits essentially production type manufacture of clad laser rod assemblies of uniform, highly desirable and advantageous optical properties.

It is still further an object of the present invention to provide a glass clad laser rod assembly which is possessed of a combination of extremely desirable high lasing capabilities and a minimum of visual and optical defects.

The foregoing as well as other objects of the present invention will become apparent to those skilled in the art from the following detailed description taken in conjunction with the annexed sheets of drawings on which there are presented, for purposes of illustration only, several preferred embodiments in the way of techniques and apparatus for carrying out the inventive method concepts for producing clad laser rods embodying the invention.

In the drawings

Figure 1:
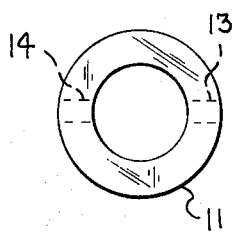
FIGS. 1 and 2 are respectively an axial end elevation view and a side sectional view of a length of machined preformed tubular glass cladding member adapted to be utilized as a surrounding cladding for a laser rod.
Figure 2:
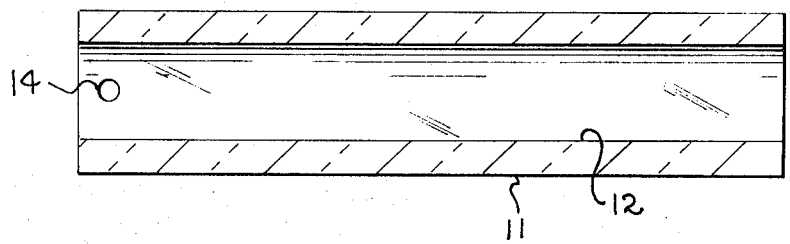
Figure 3:
FIGS. 3 and 4 are respectively an axial end elevation view and a sectional side view of a length of machined preformed glass laser rod.
Figure 4:
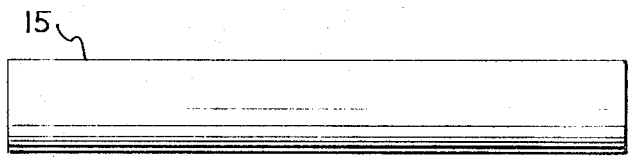
Figure 5:
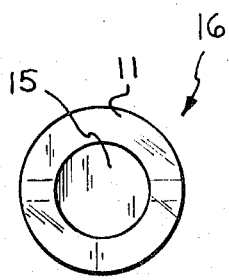
Figure 6:
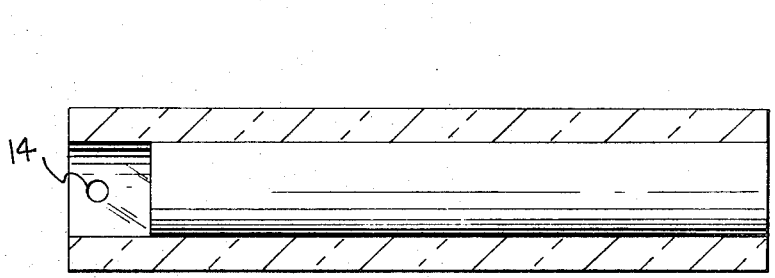
Figure 7:
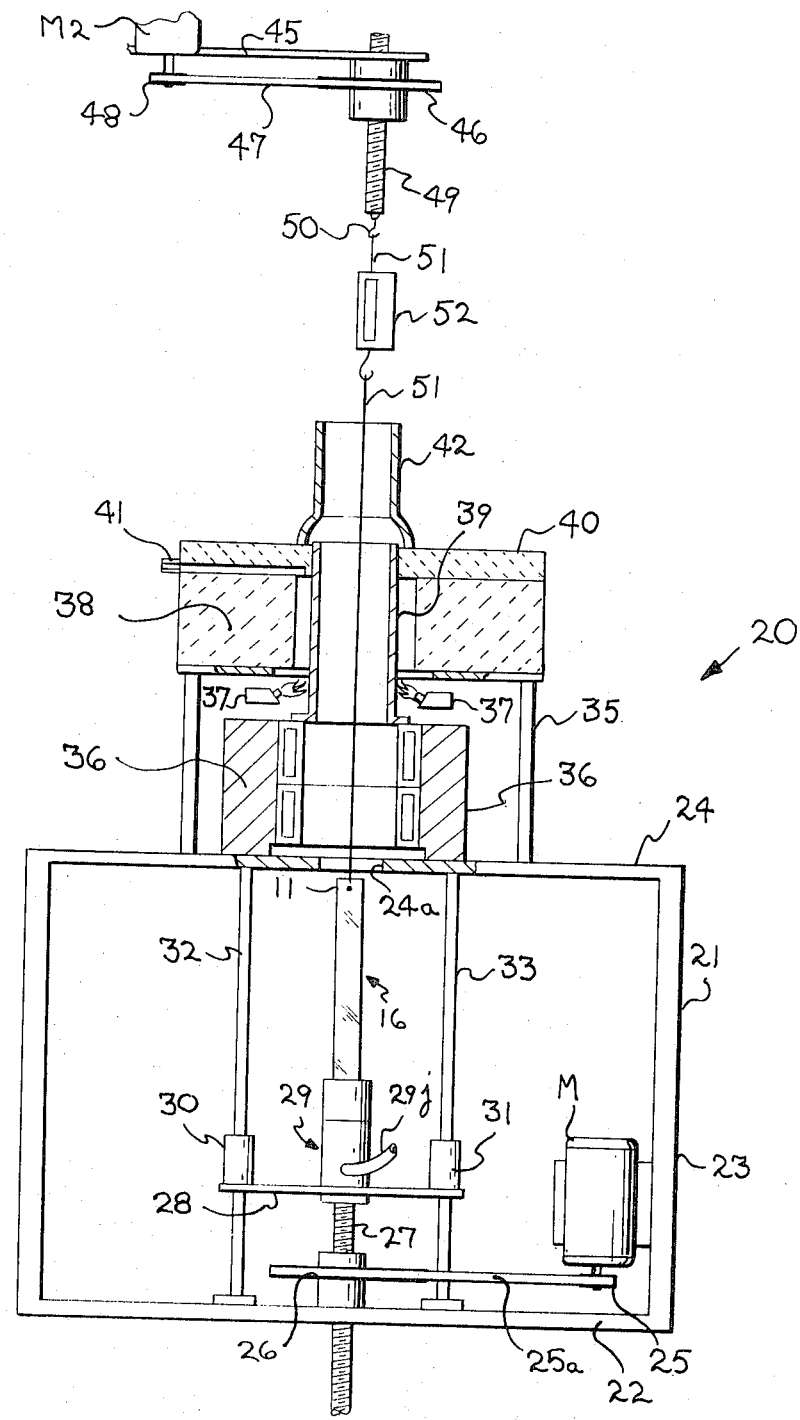
Figure 8:
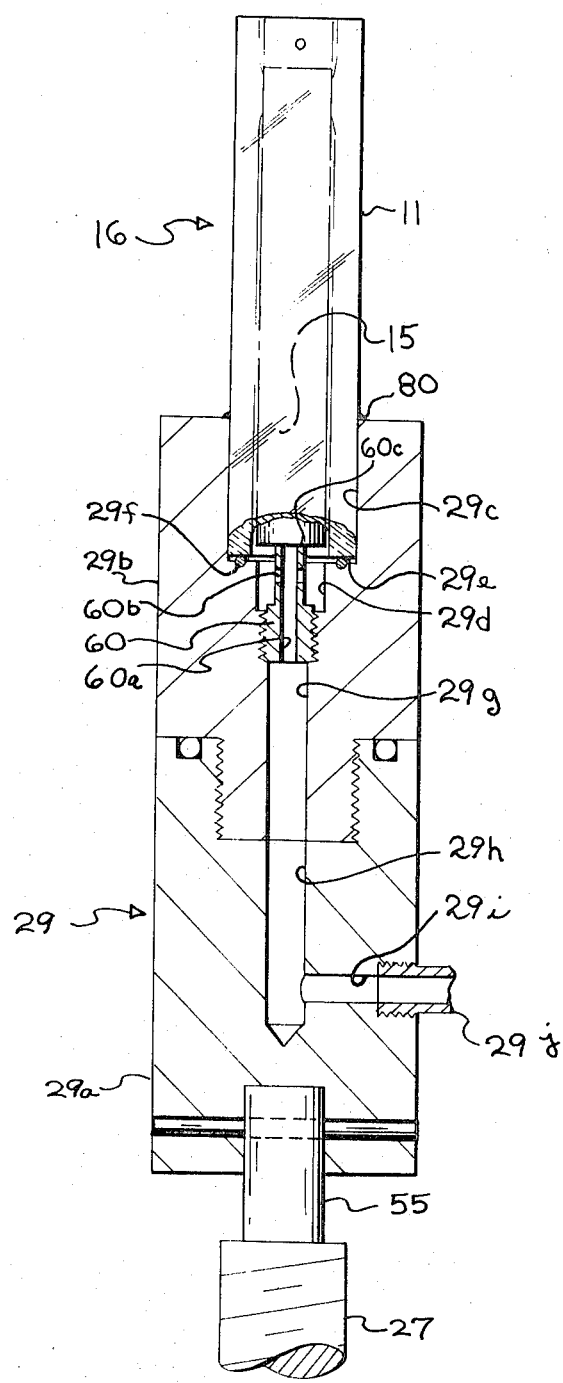
Figure 9:
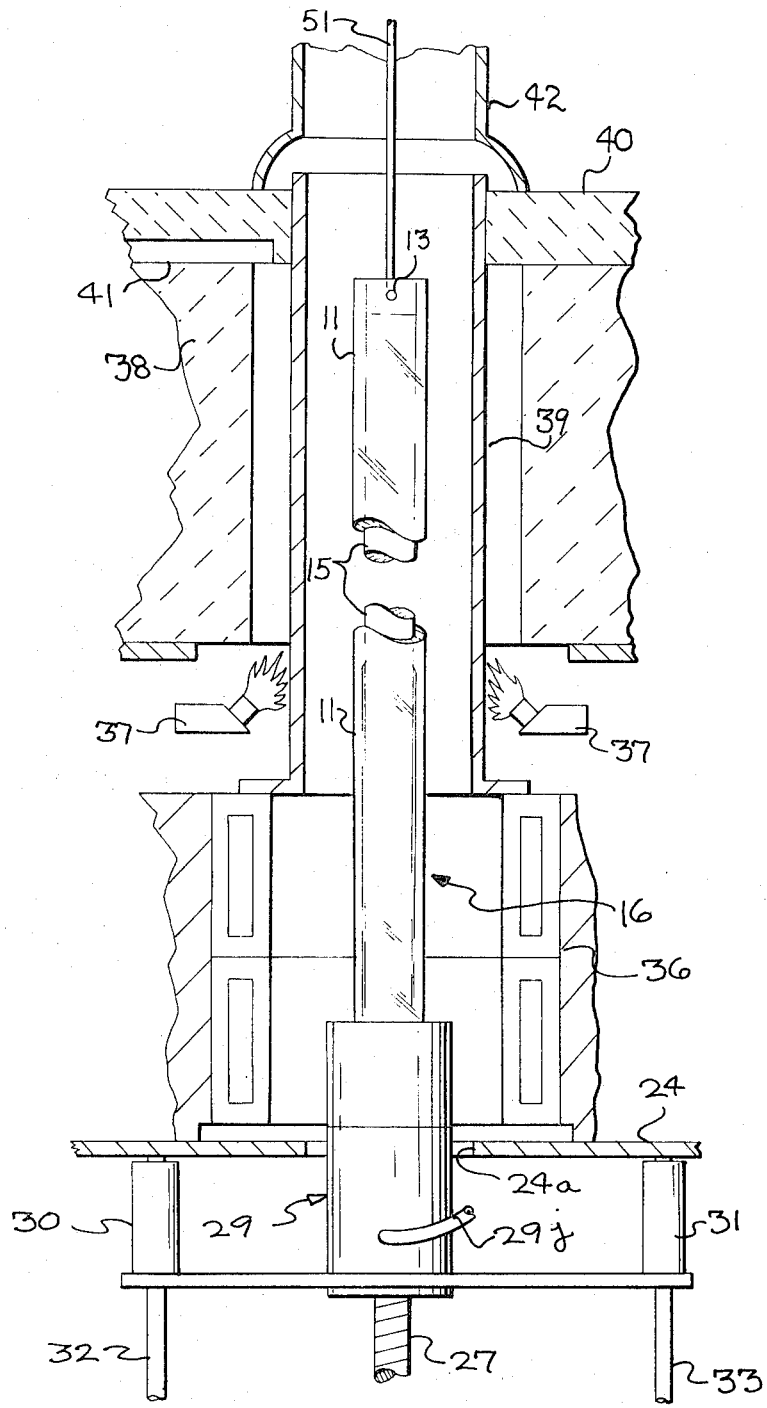

FIGS. 5 and 6 are respectively an axial end view and a sectional side elevation view of a length of the composite assembly of the glass laser rods of FIGS. 3 and 4 nested telescopically within the tubular cladding glass of FIGS. 1 and 2;

FIG. 7 is a side elevation view, partly in section, of an apparatus adapted for carrying out the method of the present invention in terms of the accomplishment of the sequence of operational steps and the providing of the environmental conditions necessary to effect a heat sealing of the laser core glass and the surrounding cladding glass;

FIG. 8 is an enlarged side elevation view, with portions shown in section, of the holder device for the cladding and the core; the holder being a part of the overall apparatus illustrated in FIG. 7; and FIG. 9 is a somewhat enlarged view of a portion of the apparatus of FIG. 7, with the holder device and the laser core and cladding components shown in the intermediate phase of the carrying out of the method of the present invention.

Referring now more specifically to the drawings, there is shown in FIG. 1 a hollow glass sleeve 11 provided with axial bore 12 and provided with a pair of small holes 13 and 14 at one end. The diametrically opposed holes 13 and 14 are transverse to the axis and in one end serve as a means for connecting a guide wire which is desirable in the carrying out of the method steps to be described.

In FIGS. 3 and 4, there is shown the solid rod 15 of laser glass; the length thereof being somewhat less than that of the sleeve. The rod illustrated serves as the core component of the ultimate laser assembly, while the tubular sleeve 11 serves as the cladding. The assembly of the core rod and the cladding is shown in FIGS. 5 and 6; the core being shown axially telescoped within the cladding sleeve.

Referring now to FIG. 7, there is disclosed the overall apparatus 20 of utility in the exposure of the assembled glass core rod and the glass clad sleeve or tubing to the sequence of steps and conditions constituting the method of the present invention. A frame 21 is composed of a bottom platform 22, marginal support leg members 23 and an upper platform 24. A vari-speed reversible motor M is mounted on the support legs 23 which rotates pulley 25, belt 25a and rotatable sprocket assembly 26 which, when suitably rotated in a given direction by appropriate electrical actuation of the motor, serves to move a feed screw 27 either up or down, depending on motor control. At the upper end of the feed screw 27, a plate 28 has secured thereto an upstanding holder 29 and spaced guide bushings 30 and 31 which slidingly embrace spaced guide rods 32 and 33; which guide rods are in spaced relationship seated on the lower frame member 22 extending vertically upstandingly to connect with top frame platform 24. Platform 24 includes a central aperture 24a, permitting upward movement of the laser rod core and cladding assembly 16 mounted in holder 29 which is shown in position prior to the actual initiation of the apparatus. Situated on top of the platform 24 is supportive framework 35, a preheater arrangement 36, ring burners 37, refractory insulation 38, a cylindrical refractory muffle 39, a lid 40, an exhaust 41 and a cylindrical muffle extension 42. Situated above the framework 20 is a horizontal support member 45 which has mounted thereon a vari-speed reversible motor M-2 and a sprocket bearing member 46 driven rotatingly by the motor via a belt 47 and the drive pulley 48 borne by the motor shaft. The sprocket bearing 46 upon rotation moves a feed screw 49 up or down, depending upon the direction of rotation of the drive motor. The feed screw 49 is vertically disposed, as can be seen, and in axial alignment with feed screw 27. Feed screw 49 has at its lower end a hook 50 supporting a tension wire 51 and a tension scale 52; the latter in turn supporting additional tension wire 51 which extends axially down through the muffle extension, the muffle 39 and the preheaters and is connected to the holes 13 and 14 in the upper end of the sleeve 11. Generally speaking, the apparatus just described functions to move the assembly of glass core rod telescopically located within a glass cladding sleeve through a series of controlled temperature zones adapted to bring the temperature of the glass rod and sleeve assembly 16 to approximately their fiber softening temperature, whereby the parts are susceptible to being heat sealed together, preferably and most efficiently when subjected to a vacuum assist as is provided by the proper operation of the apparatus and the particular design of the holder member 29 which is shown in enlarged section view in FIG. 8.

Referring to FIG. 8, the holder 29 is composed of a lower segment 29a and an upper segment 29b. The parts 29a and 29b are threadingly connected together and the lower extremity is pinned at its bottom end to a connector rod 55 which in turn is connected to the upper extremity of the feed screw 27. The pin 55 fits interiorly within an appropriate bored hole axially located in the cylindrical lower segment 29a of the holder 29. The upper segment 29b of the cylindrical holder 29 is provided with a bored hole 29c axially therein. The bored hole 29c has a dimension corresponding to the dimension of the outer diameter of the sleeve 11. A somewhat smaller diameter bored hole 29d extends axially down from the bored hole 29c, defining an annular shoulder 29e provided with an O-ring 29f upon which the lower edge of the sleeve cladding 15 rests. A still smaller axial bore 29g extends to the lower extremity of the upper segment 29b and connects with a similar sized bore 29h which extends axially downward in the lower segment 29a of holder 29 connecting with lateral bore 29i which connects to outlet 29j which is connected to a suitable controllable vacuum. A plug 60 is threadingly located in bore 29d. Plug 60 contains an axial through bore 60a which connects bore 29g with bore 29d via ports 60b in the side walls of the plug 60. The plug has a length such that the upper end 60c is disposed or located slightly horizontally above the shoulder 29e having the O-ring 29f. The upper end of the plug 60c serves as a seat for the core glass 15.

FIG. 9 is an enlargement of the segment of the apparatus in the vicinity of the preheat zone 36 and burner ring assembly 37 and shows the glass core rod and cladding sleeve assembly situated in its uppermost position as determined by the location of the holder 29 as limited by guide bushings 30 and 31. The various parts of the apparatus bear the same reference numerals as in FIGS. 7 and 8. A more detailed description of FIG. 9 will follow hereinafter.

The practice of the present invention finds its most particular application in connection, as indicated, with laser glass assemblies consisting of a rare earth doped lithia-alumina-silica glass as the core glass and a surrounding cladding glass of similar glass composition. In Table I below, there is listed the compositional analysis data for several glass compositions useful in making a core glass rod for laser applications Table II, following Table I, contains a compositional analysis of several glasses of utility in forming the hollow tubular cladding glass.

TABLE I

|  | Glass A | Glass B | Glass C |
|---|---|---|---|
| $SiO_2$ | 60.62 | 66.29 | 9.70 |
| $Al_2O_3$ | 4.41 | 4.69 |  |
| $CaO$ | 9.71 | 10.31 | 12.00 |
| $Li_2O$ | 14.22 | 15.11 |  |
| $CeO_2$ | 0.48 | 0.51 |  |
| $Yb_2O_3$ | 10.23 | — |  |
| $Er_2O_3$ | 0.33 | — |  |
| $Nd_2O_3$ | — | 3.09 |  |
| $Nb_2O_5$ |  |  | 3.00 |
| $ZrO_2$ |  |  | 5.00 |
| $BaO$ |  |  | 29.00 |
| $B_2O_3$ |  |  | 10.80 |
| $WO_3$ |  |  | 3.00 |
| $Ta_2O_5$ |  |  | 3.00 |
| $La_2O_3$ |  |  | 24.50 |
| Liquidus Temp. | N.A.* | 1808° F. | 2063° F. |
| Log. Visc. at Liq. Temp. | N.A. | 2.5 | 1.75 |

*Not available

TABLE II

|  | Glass D | Glass E | Glass F | Glass G |
|---|---|---|---|---|
| $SiO_2$ | 68.4 | 64.8 | 63.99 | 64.5 |
| $Al_2O_3$ | 4.84 | 4.4 | 4.61 | 7.5 |
| $CaO$ | 10.64 | 10.1 | 10.14 | 0.1 |
| $Li_2O$ | 15.60 | 15.2 | 14.85 | 0.6 |
| $CeO_2$ | 0.53 | 0.51 | 0.51 | — |
| $Sm_2O_3$ | — | 5.0 | — | — |
| $Er_2O_3$ | — | — | 2.86 | — |
| $Nd_2O_3$ | — | — | 3.04 | — |
| $B_2O_3$ |  |  |  | 18.4 |
| $K_2O$ |  |  |  | 3.3 |
| $Na_2O$ |  |  |  | 2.2 |
| $BaO$ |  |  |  | 2.8 |
| $Cl$ |  |  |  | 0.2 |
| $Fl$ |  |  |  | 0.5 |
| Liquidus Temp. | 1792° F. | 1820° F. | N.A.* | 832° C. |
| Log. Visc. at Liq. Temp. | N.A.* | N.A.* | N.A.* | 6.13 |
| Fiber Softening Temps.(° C.) |  |  |  | 710–716° C. |

\* Not available

A particularly desirable laser assembly features a core glass formulated of Glass B (Table I) with the cladding formulated of Glass E (Table II). Glass D, (Table II) is eminently suitable as a cladding glass for a core glass formulated of Glass B composition (Table I).

Another desirable combination features a core glass formed of Glass A of Table I and the cladding being formed of Glass F of Table II.

Representing a less preferred but operable combination within the framework of the present invention is the Glass C which is a composition of utility in the field of fiber optics. In this embodiment, a plurality of fibers featuring a Glass C composition is assembled together by various draw and redraw operations into multiple filament assemblies and thence clad with a glass such as Glass G of Table II. Such a clad assembly is then redrawn to make a final assembly in which the cladding surrounding the subelements of the ultimate assembly serves an optical function in which a minimum of surface to surface defects is a desirable characteristic.

As indicated earlier herein, the core glass such as Glass B and the cladding glass such as Glass E are first formed into generally cylindrical configurations by a cast technique. The cast parts are then physically machined, bored and honed to predetermined dimensions. Utilizing Glass B, a rod is machined and abrasive polished to a dimension of about ¾ inch diameter O.D. and a length of about 20 to 30 inches. A cylindrical cladding glass of Glass E is machined, bored and sized to a dimension of about 1 inch O.D. and an I.D. of three-fourths or 0.750 inches. It is somewhat longer than the core glass. The physical sizing and dimensioning of the core and the cladding glass are accomplished with conventional core drilling, honing and abrasive techniques and need not be described in detail. Suffice it to say that the O.D. of the core rod glass and the I.D. of the cladding glass are rather carefully controlled since these are the two dimensions which are important in terms of the ultimate heat sealing of the parts together. The parts are next cleaned with alcohol to remove grease, dirt and other smudges that might remain from the physical abrasion and grinding operations. The core and the cladding glass are next acid polished by repeated immersion in an acid bath so composed as to slowly attack the glass surface to remove same without damage. A bath of 30 percent hydrofluoric acid and 70 percent sulfuric acid by volume, using reagent grades of hydrofluoric and sulfuric acid, is eminently suitable and was used. The parts are positioned vertically in the repeated dunking immersions, followed by a water rinse. This immersion technique is repeated four or five times to effect removal of a thin layer of the surface of the rod and cladding. Ideally, the parts are treated until there is a slight clearance which will permit the rod to be nested carefully within the bore of the cladding. The clearance should vary from about 0.015 to about 0.040 inches. It is preferred that somewhat more of the surface of the inside diameter of the cladding be removed by the acid treatment than the outer surface of the core. The acid treatment of the inside surface of the cladding is desirably continued to remove about 0.015 to 0.030 inches. The outside surface of the core is acid polished to remove about 0.005 to 0.007 inches.

The acid treatment, sometimes referred to as a polishing, results in a glass surface which is best characterized as pristine or essentially free of any surface defects. A pristine glass surface is comparable to the surface of a freshly formed glass part such as the surface of a freshly drawn glass fiber.

The parts are then very carefully placed in telescoped relationship; care being taken not to touch the surfaces together. One end of the assembly is located in the holder 29 in the manner illustrated in FIG. 8. Vertical stability against wobbling is provided by attachment of the guide tension wire 51 which is attached to the holes 13 and 14 in one end of the tubular cladding. The parts are then located in the apparatus as illustrated in FIG. 7. The preheater arrangement 36 and the primary furnace burner ring 37 is adjusted so that the preheat temperature is just above the strain point of the glass concerned. The burner ring 37 is controlled employing appropriate known thermal couples and controls (not shown) such that the temperature proximate the burner ring is approximately 200° F. above the fiber softening point of the glass. When the above temperature have been established, the motors are energized, serving to move the holder with the glass core and cladding therein upwardly through the heat zones, with stability being provided by the guide wire 51 and a controlled pull being maintained on the assembly by means of the tension device 52 and the upper feed screw 49. As the glass commences to move into the hot zone of the furnace, the motors are operator-controlled to effect a slight differential between the upper and lower feed rates in order to exert a slight tensile pull at the top of the cladding. A vacuum is imposed on the system by connecting line 29j to a suitable vacuum controlled to provide a vacuum measuring about 28 to 30 inches of mercury of vacuum. The vacuum applied to the line 29j (FIG. 8) is exerted through bore 29i to 29h, thence to bore 29g and passageway 60a in plug 60. Passageway 60a connects through ports 60b to bore 29d and to the clearance space between the core rod and the cladding. Thus the bottom of the core rod and the cladding bottom edge are slightly spaced apart vertically by means of the higher position of the upper edge 60c of plug 60. As the upper end of the glass parts reach the hot zone, the cladding glass will, by reason of the elevated temperature and the slight differential mechanical pull as assisted by the vacuum, in effect, collapse or shrink into surface abutment with the core glass outer surface, with this phenomena being continued as the assembly is moved uniformly upwardly at a rate of about one-fourth inch per minute. Once the initial seal has been established, the burner ring can be controlled so that the furnace temperature is maintained at approximately 100° F. above the fiber softening point of the glasses. As can be seen in FIG. 9, the outer glass is in effect collapsing or shrinking inwardly onto the outer surface of the solid core glass. The upward movement of the assembly is continued until the position such as illustrated in FIG. 9 is reached, whereupon the temperature is reduced to avoid any deformation or devitrification. Upon cooling, the assembly of glass parts heat sealed together is removed and the operation repeated with another set of core and cladding parts. Inspection of the cooled part reveals no visual defects as can be observed looking laterally through the assembly at the interface between the rod and the cladding.

The heat-sealed assembly may be further processed by appropriate annealing and subsequent machining to the desired configuration desired by the user for use in the ultimate application.

Glasses A through E in Tables I and II hereinabove have rather narrow working temperatures and it is desired, with the aspects of the present invention, to maintain the temperature in the preheat and primary heat zones to below that which is detrimental to the ultimate use or adversely affect the visual quality of the seal interface. The glasses of Table I and II should preferably not be exposed to a temperature above about 1,300° F. since the unique formulation of these glasses, which imparts to them the desirable lasing capabilities, also makes the glass subject to devitrification if held at temperatures of 1,300° F. or above for any appreciable length of time. On the other hand, the temperature within the treatment zones should usually be above about 1,100° F., otherwise the heat shrinking or collapsing of the clad tubing onto the core will not be realized.

Among the several important criteria of the present invention is included the acid treatment of the glass surface to arrive at a surface which is essentially pristine in character since this quality surface provides an optically desirable heat-sealed interface surface between the surfaces to be joined. Another important criteria involves the use of the reduced pressure in order to augment the temperature and pristine condition of the surfaces, thereby urging the two surfaces together. The foregoing criteria, plus the relatively low temperature, avoid difficulties that might otherwise be encountered and promote, as indicated, the production of a desirable surface joinder of the two components; the interface thereof being characterized by a substantial freedom of any defects as might otherwise interfere with the utility of the product in its laser application.

The several concepts involved have been described with particular reference to certain disclosed glass compositions. The steps of the process are particularly adapted to achieve the noted results with glasses of the type concerned, particularly for a laser type application. As indicated, however, the invention has utility in a wider scope of practice as, for example, in the field of fiber optics. The techniques and concepts disclosed herein are further capable of utility in a still wider scope of applications in which it is generally beneficial or necessary for two glass parts to be joined together.

Modifications may be resorted to without departing from the spirit and scope of the present invention as defined in the appended claims.

I claim:

1. The method of combining an elongate preformed core structure formed of a glass having lasing properties and concomitant low devitrification temperature and a protective preformed cylindrical cladding formed of a glass having similar low devitrification temperature, said method comprising:
   acid treating the outer surface of the core and the interior surface of the cylindrical cladding to a pristine condition,
   locating the core and the cylindrical cladding in telescoped relationship with the mating surfaces to be joined in closely spaced relationship, and
   heating the surfaces to be joined incrementally along said telescoped length to approximately the fiber softening temperature of the glasses, while simultaneously
   impressing a vacuum in the space between the surfaces to be joined and simultaneously exerting an initial tensil pull on said cylindrical cladding, whereby the temperature and the vacuum cause said surfaces to become incrementally joined in heat-sealed relationship, the interface defined by said incrementally joined surfaces being substantially free of voids, inclusions and the like.

2. The method as claimed in claim 1, wherein said acid treatment includes surface exposure to an acid mixture of hydrofluoric acid and sulfuric acid.

3. The method of combining or joining together a preformed cylindrical glass core and a preformed, hollow cylindrical glass cladding, said method comprising:
   locating the core and the cylindrical cladding in telescoped relationship with the mating surfaces in closely spaced relationship,
   impressing a vacuum in the space between the adjacent surfaces to be joined,
   effecting relative incremental axial movement between said telescoped assembly and a localized source of heat encircling said assemblement, said heat being controlled to bring the glass parts to approximately the fiber softening temperature thereof and at the same time or simultaneously exerting an initial differential tensile force or pull on the cylindrical jacket to effect a shrinking or collapsing of the cylindrical cladding onto said core, providing thereby an improved heat-sealed joinder of the two components, the interface being substantially free of voids, inclusions and the like.

4. The method of joining an elongate preformed cylindrical core formed of glass of unusual optical properties and possessed of a low devitrification temperature and an elongate, preformed tubular cladding of glass possessed of low devitrification temperature, said method comprising:
   locating the elongate core and the elongate cladding in predetermined telescoped relation with the joining surfaces in closely spaced relationship thereby defining a space between the core and the cladding and
   heating said core and cladding under reduced pressure in the said space to heat seal said parts together while imposing an initial tensile pull on said tubular cladding to assist said heat sealing.

5. A method of producing a heat joined, light transmitting, two-piece assembly composed of an elongate glass core and a surrounding elongate tubular cladding glass; said method comprising:
   machine the outside diameter of the length of core glass and the inside diameter of the length of tubular glass, both formed of cast glass, to approximately the same dimension,
   acid treat the glass parts, enlarging the inside diameter of the tubular cladding and reducing the outside diameter of said core so that, when said parts are concentrically telescoped, there exists a clearance of from about 0.015 to about 0.040 inches,
   position said lengths of core and tubular cladding in spaced telescoped relationship,
   effect relative axial movement between said elongate assemblement and a localized heat zone positioned to encircle said assemblement, thereby raising the temperature of incrementally successive segments of said elongate glass to about the fiber softening temperature of the glasses,
   simultaneously exert an initial tensile pull on said tubular cladding glass and impress a vacuum in the space defined by said clearance to slightly shrink said tubular cladding, whereby the inner surface of said tubular cladding glass becomes heat sealed to the outer surface of said core glass while within said zone, and
   continue relative movement of said elongate glass assemblement and said heat zone and said impressment of reduced pressure in said space to continue heat sealing joinder of said core and cladding to form said light transmitting two-piece assembly.

6. The method as claimed in claim 5, wherein said core glass is a lithium silicate glass having a devitrification temperature of about 1,300° F.

7. Apparatus for joining together an elongate cylindrical glass core and a surrounding cylindrical glass cladding which comprises:
   means for holding said core and cylindrical cladding in vertical slightly spaced telescoping relationship,
   means defining a preheat region calculated to bring the glass components to just above their strain point,
   means defining a primary heat region calculated to bring the glass components to just below their fiber softening point,
   means providing relative vertical axial movement between said holding means and said preheat and primary heat regions, thereby moving said components incrementally through said regions,
   means for impressing a vacuum in the space between said core glass and cladding glass and
   means for effecting a tension in said cylindrical cladding to augment the heat and vacuum shrinkage of said cylindrical cladding onto said core.

* * * * *

UNITED STATES PATENT OFFICE
CERTIFICATE OF CORRECTION

Patent No. 3,656,925     Dated April 18, 1972

Inventor(s) GLENN H. DUNLAP

It is certified that error appears in the above-identified patent and that said Letters Patent are hereby corrected as shown below:

In the Abstract, Col. 2, line 8, "produce" should be ---product---. Col. 4, line 36, "applications" should be ---application.---. Col. 5, line 5, after "D" delete comma. Col. 6, line 7, "temperature" should be ---temperatures---.

Signed and Sealed this tenth Day of February 1976

[SEAL]

Attest:

RUTH C. MASON
*Attesting Officer*

C. MARSHALL DANN
*Commissioner of Patents and Trademarks*